United States Patent
Mayhew

(10) Patent No.: US 12,367,093 B2
(45) Date of Patent: Jul. 22, 2025

(54) VEHICLE SOFTWARE SECURITY USING GÖDEL NUMBERING

(71) Applicant: FCA US LLC, Auburn Hills, MI (US)

(72) Inventor: William R Mayhew, Ann Arbor, MI (US)

(73) Assignee: FCA US LLC, Auburn Hills, MI (US)

( * ) Notice: Subject to any disclaimer, the term of this patent is extended or adjusted under 35 U.S.C. 154(b) by 116 days.

(21) Appl. No.: 18/482,279

(22) Filed: Oct. 6, 2023

(65) Prior Publication Data

US 2025/0117278 A1    Apr. 10, 2025

(51) Int. Cl.
 *G06F 11/07* (2006.01)
 *B60W 10/20* (2006.01)

(52) U.S. Cl.
 CPC ......... *G06F 11/0772* (2013.01); *B60W 10/20* (2013.01)

(58) Field of Classification Search
 USPC .......................................... 701/41
 See application file for complete search history.

(56) References Cited

U.S. PATENT DOCUMENTS

| | | | |
|---|---|---|---|
| 9,870,665 B2 | 1/2018 | Maiwand et al. | |
| 10,663,954 B2 | 5/2020 | Huard et al. | |
| 10,664,413 B2 | 5/2020 | Fons et al. | |
| 11,496,506 B2 | 11/2022 | Ando | |
| 11,524,656 B2 | 12/2022 | Yorke et al. | |
| 2004/0194006 A1* | 9/2004 | Piret ..................... | H03M 13/17 714/800 |
| 2012/0173931 A1* | 7/2012 | Kube .................. | G05B 23/0256 714/E11.178 |
| 2015/0239357 A1 | 8/2015 | Huntzicker et al. | |

* cited by examiner

*Primary Examiner* — Yi-Kai Wang
(74) *Attorney, Agent, or Firm* — Jeremy J. Klobucar

(57) ABSTRACT

Software security techniques for a vehicle include defining a plurality of waypoints within the plurality of operations of a software executed by a control system of the vehicle and defining a plurality of operations, applying Gödel numbering to the software by (i) assigning a unique integer to each of the plurality of waypoints and (ii) assigning a unique prime number to each sequential operation of the plurality of operations, calculating a Gödel number for an executed sequence of the plurality of operations, comparing the calculated Gödel number to a set of acceptable Gödel numbers corresponding to a set of acceptable sequences for executing the plurality of operations, and when the calculated Gödel number does not match any of the set of acceptable Gödel numbers, controlling, by the control system, a vehicle sub-system according to a remedial or corrective action.

18 Claims, 3 Drawing Sheets

VEHICLE SOFTWARE SECURITY USING GÖDEL NUMBERING

FIELD

The present application generally relates to vehicle software security and, more particularly, to improved software security for vehicle safety critical (e.g., drive-by-wire) systems.

BACKGROUND

Vehicle safety critical (e.g., drive-by-wire) systems typically generate "black box flight recorder" type or on-board diagnostic (OBD) freeze frame data. Conventional solutions for these systems only reset a controller in response to software security issues and do not allow or enable post-mortem debugging or intelligent recovery actions. Thus, there is no assurance that a designed-in problem can correct itself after a controller reset (i.e., because there is no way to identify the error). This could be particularly problematic for complex vehicle systems where there are many interconnected drive-by-wire systems and distributed/independent computing processes that may be asynchronous. Other conventional solutions specifically designed for and directed to solving this specific problem could drastically increase vehicle costs, particularly as vehicle systems become more complex and the number of controllers increases. Accordingly, while such conventional vehicle software security systems do work for their intended purpose, there exists an opportunity for improvement in the relevant art.

SUMMARY

According to one example aspect of the invention, a software security system for a vehicle is presented. In one exemplary implementation, the software security system comprises a control system configured to control operation of the vehicle, a vehicle sub-system configured to be electronically controlled by the control system via software executed by the control system, wherein the software defines a plurality of operations, and wherein the control system is further configured to define a plurality of waypoints within the plurality of operations of the software, apply Gödel numbering to the software by (i) assigning a unique integer to each of the plurality of waypoints and (ii) assigning a unique prime number to each sequential operation of the plurality of operations, calculate a Gödel number for an executed sequence of the plurality of operations, compare the calculated Gödel number to a set of acceptable Gödel numbers corresponding to a set of acceptable sequences for executing the plurality of operations, and when the calculated Gödel number does not match any of the set of acceptable Gödel numbers, control the vehicle sub-system according to a remedial or corrective action.

In some implementations, the vehicle sub-system is a drive-by-wire system in which the vehicle sub-system is configured to electromechanically control a corresponding vehicle actuator in response to electronic control signals from the control system. In some implementations, the vehicle sub-system includes at least one of an electric motor system, a brake system, and a transmission system. In some implementations, the vehicle sub-system includes a plurality of independent and interconnected drive-by-wire systems. In some implementations, the software is executed asynchronously by the control system. In some implementations, the software is partially executed by at least two independent controllers of the control system or by at least two independent cores of a single processor of the control system.

In some implementations, the control system is configured to control the vehicle sub-system according to the remedial or corrective action without resetting the control system and is further configured to generate or maintain an error log detailing any executed sequences of operations having unmatched calculated Gödel numbers In some implementations, the control system is configured to intelligently analyze a particular error in the error log by decomposing the calculated Gödel number value via prime number factoring to identify where in the executed sequence of the plurality of operations the error occurred. In some implementations, the control system is configured to perform self-learning based on the logged/stored and analyzed errors.

According to another example aspect of the invention, a software security method for a vehicle is presented. In one exemplary implementation, the software security method comprises providing a control system configured to control operation of the vehicle, providing a vehicle sub-system configured to be electronically controlled by the control system via software executed by the control system, wherein the software defines a plurality of operations, defining, by the control system, a plurality of waypoints within the plurality of operations of the software, applying, by the control system, Gödel numbering to the software by (i) assigning a unique integer to each of the plurality of waypoints and (ii) assigning a unique prime number to each sequential operation of the plurality of operations, calculating, by the control system, a Gödel number for an executed sequence of the plurality of operations, comparing, by the control system, the calculated Gödel number to a set of acceptable Gödel numbers corresponding to a set of acceptable sequences for executing the plurality of operations, and controlling, by the control system, the vehicle sub-system according to a remedial or corrective action when the calculated Gödel number does not match any of the set of acceptable Gödel numbers.

In some implementations, the vehicle sub-system is a drive-by-wire system in which the vehicle sub-system is configured to electromechanically control a corresponding vehicle actuator in response to electronic control signals from the control system. In some implementations, the vehicle sub-system includes at least one of an electric motor system, a brake system, and a transmission system. In some implementations, the vehicle sub-system includes a plurality of independent and interconnected drive-by-wire systems. In some implementations, the software is executed asynchronously by the control system. In some implementations, the software is partially executed by at least two independent controllers of the control system or by at least two independent cores of a single processor of the control system.

In some implementations, the control system is configured to control the vehicle sub-system according to the remedial or corrective action without resetting the control system, and wherein the method further comprises generating or maintaining, by the control system, an error log detailing any executed sequences of operations having unmatched calculated Gödel numbers. In some implementations, the software security method further comprises intelligently analyzing, by the control system, a particular error in the error log by decomposing the calculated Gödel number value via prime number factoring to identify where in the executed sequence of the plurality of operations the error occurred. In some implementations, the software security method further comprises performing, by the control system, self-learning based on the logged/stored and analyzed errors.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional vehicle software security solutions only reset a controller (without allowing for debugging or error detection) or require specially designed software security systems that drastically increase vehicle costs. Accordingly, improved vehicle software security systems and methods are presented herein. These techniques create software "waypoints" with assigned integer values to produce a single number that corresponds to a complete sequence of calculations using a concept known as Gödel numbering. Gödel numbering is effectively a type of encoding in which a number is assigned to each symbol (number, variable, operator, etc.) of a mathematical notation and a sequence of natural numbers can then represent a sequence of symbols. For a series of calculations that must be performed in one of several specified orders, this allows for detecting improper order of operations. Allowing for varying sequences (each with a result matching a limited number of sequence results), this also allows for securing asynchronous software (e.g., split between controllers, multiple cores of a processor, or multiple functions of the same algorithm). The stored error values could also form a self-learning system (e.g., learn a tolerance for propagating errors).

Figure 1:
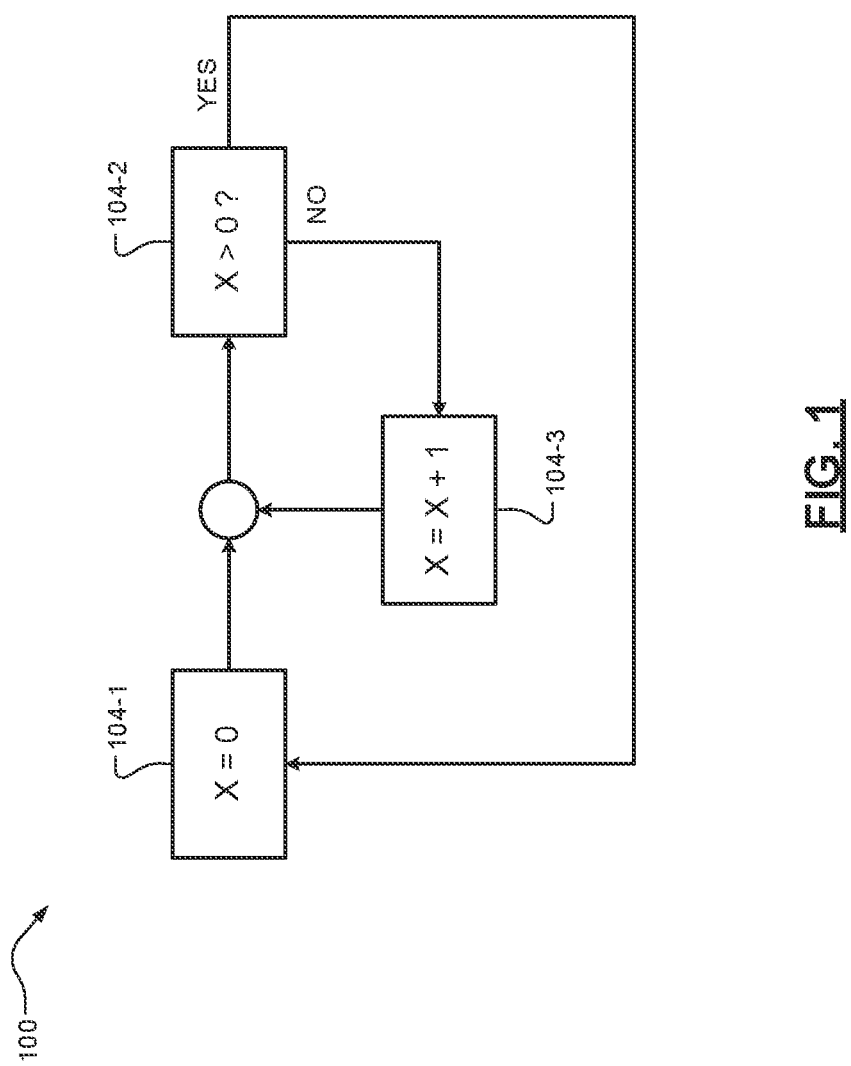
FIG. 1 is a block diagram of a simple three operation example system for describing Gödel numbering according to the principles of the present application.

Referring now to FIG. 1, a block diagram of a simple three operation example system 100 for describing Gödel numbering according to the principles of the present application is illustrated. The system 100 can be divided into three distinct operations 104-1, 104-2, and 104-3 (collectively, "operation 104"). Each operation 104 could exist either in a same controller/processor core (synchronous operations) or at least some of the operations 104 could exist in different controllers or different cores of a single processor (asynchronous operations). The ability for the techniques of the present application to handle asynchronous operations is particularly important for vehicle applications where there are increasing numbers of independent and interconnected vehicle controllers or electronic control units (ECUs). For example only, the operations 104-1, 104-2, and 104-3 may be implemented in three separate controllers or processor cores (of a single processor or multiple processors). It will also be appreciated that the term "vehicle" as used herein can refer to traditional passenger automobiles as well as other types of vehicles, such as public transport vehicles (e.g., buses), rail vehicles (trains, subways, monorails, tramways, etc.), aviation vehicles (passenger planes, military planes, remote controlled aircraft, etc.), and the like.

As shown, the first operation 104-1 initializes or sets a variable "x" equal to a value of zero. A second operation 104-2 determines whether the value of the variable x is greater than zero. When false, a third operation 104-3 increments or increases the value of the variable x by a value of one and the system 100 returns to the second operation 104-2. When true, the system 100 returns to the first operation 104-1. The operations 104 are divisible into the three operations 104-1 . . . 104-3 with waypoints defining specific separation points therebetween. The Gödel numbering of the present application involves (i) assigning unique integers (1, 2, 3, etc.) to the waypoints and (ii) assigning a unique prime number to each sequential operation or "step" (e.g., 2, 3, 5, 7, and 11 for first through fifth sequential operations). For every permissible executable series or sequence of the operations 104, a Gödel number can be calculated. Tables 1, 2, and 3 (below) illustrate four permissible sequences of the operations 104, the calculation of values of $P^S$ (where P is the unique prime number and S is the unique integer), and the final calculation of the Gödel numbers as a multiplication of the $P^S$ values for each sequence.

TABLE 1

| Permissible Sequences of Steps S = 1, 2, and 3 | | | | |
|---|---|---|---|---|
| 1 | 2 | 3 | 2 | 1 |
| 2 | 3 | 2 | 1 | 2 |
| 2 | 1 | 2 | 3 | 2 |
| 3 | 2 | 1 | 2 | 3 |

TABLE 2

| $P^S$ for First Five Primes P = 2, 3, 5, 7, and 11 | | | | |
|---|---|---|---|---|
| 2 | 9 | 125 | 49 | 11 |
| 4 | 27 | 25 | 7 | 121 |
| 4 | 3 | 25 | 343 | 121 |
| 8 | 9 | 5 | 49 | 1331 |

TABLE 3

| Gödel Numbers for Each Permissible Sequence | |
|---|---|
| 2 × 9 × 125 × 49 × 11 = | 1212750 |
| 4 × 27 × 25 × 7 × 121 = | 2286900 |
| 4 × 3 × 25 × 343 × 121 = | 12450900 |
| 8 × 9 × 5 × 49 × 1331 = | 23478840 |

When the calculated Gödel number for an executed series or sequence of operations matches one of these Gödel numbers (see Table 3), then the combined algorithm (the series/sequence of operations) is determined to be acceptable (e.g., by a supervisory control system or scheme). As counter examples, there could be instances where series or sequences of the operations 104 perform operation 104-1 twice in succession before executing operation 104-2, which could be impermissible or unacceptable. Examples of these impermissible sequences of operations or steps, the corresponding $P^S$ values, and the calculated Gödel numbers are illustrated in Tables 3-5 (below).

TABLE 3

Impermissible Sequences of Steps S = 1, 2, and 3

| 1 | 1 | 2 | 3 | 2 |
|---|---|---|---|---|
| 2 | 3 | 2 | 1 | 1 |
| 2 | 1 | 1 | 2 | 3 |
| 3 | 2 | 1 | 1 | 2 |

TABLE 4

$P^S$ for First Five Primes P = 2, 3, 5, 7, and 11

| 2 | 3 | 25 | 343 | 121 |
|---|---|----|-----|-----|
| 4 | 27 | 25 | 7 | 11 |
| 4 | 3 | 5 | 49 | 1331 |
| 8 | 9 | 5 | 7 | 121 |

TABLE 5

Gödel Numbers for Each Impermissible Sequence

| 2 × 3 × 25 × 343 × 121 = | 6225450 |
|---|---|
| 4 × 27 × 25 × 7 × 11 = | 207900 |
| 4 × 3 × 5 × 49 × 1331 = | 39113140 |
| 8 × 9 × 5 × 7 × 121 = | 304920 |

When the calculated Gödel number is one of the above numbers (which does not match any of the permissible Gödel numbers), the supervisory control can store the calculated Gödel number (e.g., in an error log) and force corrective or remedial action(s). The error logging process could be arbitrarily detailed (i.e., specific lines of code, memory access operations, etc.) or could be abstract.

Figure 2:
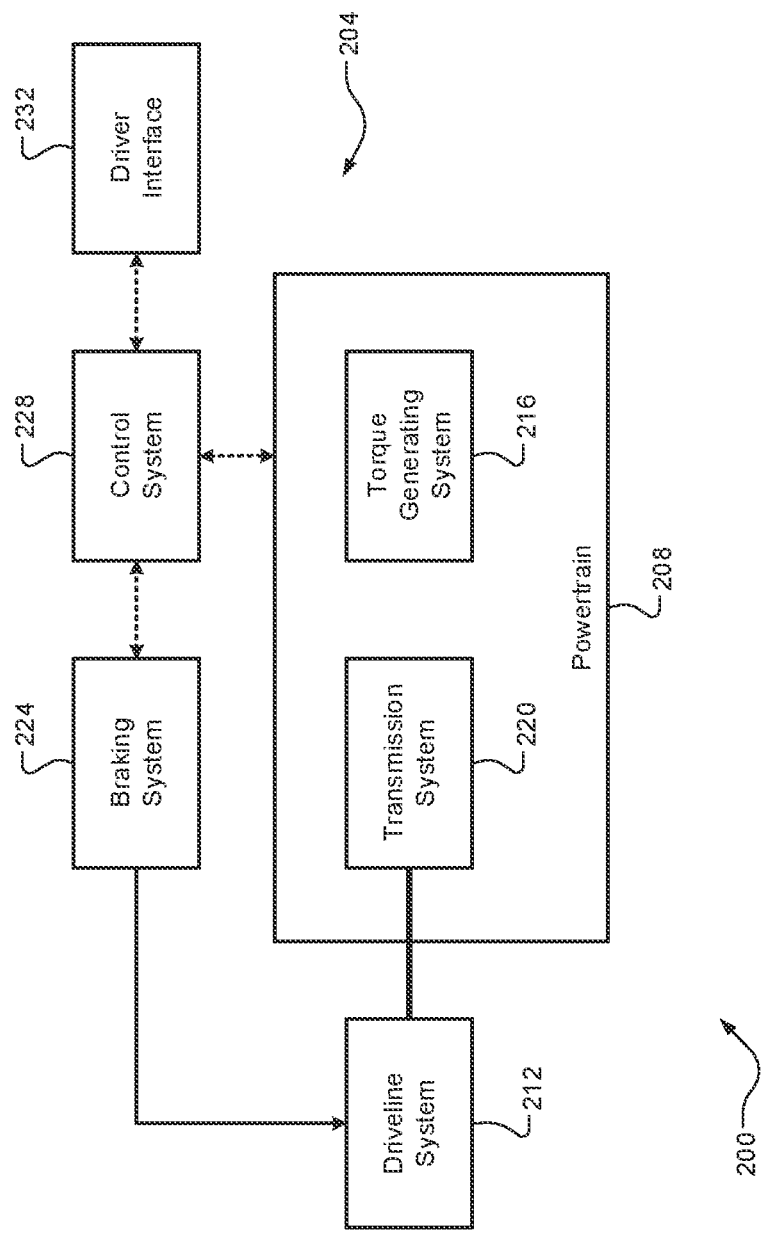
FIG. 2 is a functional block diagram of a vehicle having an example software security system using Gödel numbering according to the principles of the present application.

Referring now to FIG. 2, a functional block diagram of a vehicle 200 having an example software security system 204 using Gödel numbering according to the principles of the present application is illustrated. The vehicle 200 includes a powertrain 208 configured to generate and transfer torque to a driveline system 212 for vehicle propulsion. The powertrain 208 generally comprises a torque generating system 216 and a transmission system 220. The torque generating system 216 includes an internal combustion engine, one or more electric motors, or a combination thereof. The transmission system 220 includes a multi-speed automatic transmission and any other suitable components, such as a fluid coupling or torque converter. The driveline system 212 includes driveline components (drive/half shafts, axles, wheels, etc.) and is also associated with a braking system 224 configured to selectively apply braking force thereto. The torque generating system 216, the transmission system 220, and the braking system 224 (and possibly part of the driveline system 212) are all "drive-by-wire" systems in that they are mechanical or electro-mechanical systems that are electronically controlled and each can include one or more actuators (switches, valves, etc.) for actuation by the control system 228.

A control system 228 is configured to control operation of the vehicle 200 and, more particularly, the various drive-by-wire sub-systems 212, 216, 220, and 224. It will be appreciated that the control system 228 is configured to control other suitable sub-systems (not shown) of the vehicle 200 and that the techniques of the present application would be similarly applicable to such electronically-controlled sub-systems. The control system 228 could control propulsion/braking at the driveline system 212 in response to a driver torque request and a driver braking request, which could be received via a driver interface 232 (e.g., accelerator and brake pedals). Because the control system 228 performs electronic control of the various drive-by-wire sub-systems 212, 216, 220, and 224 of the vehicle 200, there are functional safety and timing requirements (also referred to herein as "security requirements") such that the embedded software minimizes accident risk and ensures automotive components perform their intended functions correctly and at the right time (e.g., international standard ISO 26262—"Road vehicles—Functional safety). The software security system 204 of the vehicle 200 may therefore comprise the control system 220 and one or more of the vehicle sub-systems 212, 216, 220, and 224.

Figure 3:
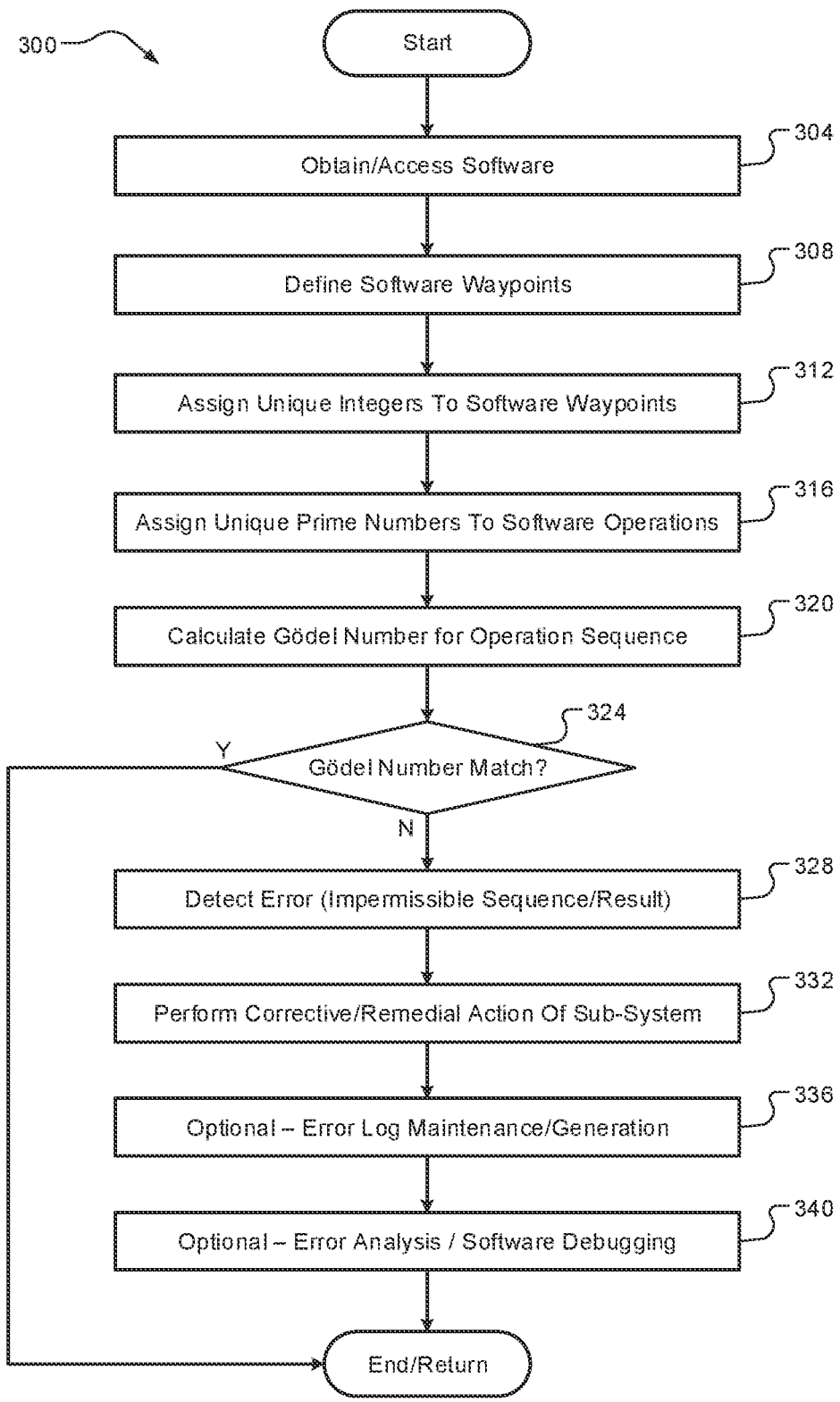
FIG. 3 is a flow diagram of an example vehicle software security method using Gödel numbering according to the principles of the present application.

Referring now to FIG. 3, a flow diagram of an example vehicle software security method 300 using Gödel numbering according to the principles of the present application is illustrated. While the software security system 204 (the control system 220) of the vehicle 200 are specifically referenced for descriptive/illustrative purposes, it will be appreciated that the method 300 could be applicable to any suitable configured vehicle control system. At 304, the control system 220 obtains or accesses (e.g., from a memory) a software comprising a plurality of operations. At 308, the control system 220 defines a plurality of waypoints within the plurality of operations of the software. It will be appreciated that these waypoints could be predefined within the software (i.e., not defined on-the-fly). At 312 and 316, the control system 220 applies Gödel numbering to the software by (i) assigning a unique integer (1, 2, 3, etc.) to each of the plurality of waypoints at 312 and (ii) assigning a unique prime number (2, 3, 5, 11, 13, etc.) to each sequential operation of the plurality of operations at 316. At 320, the control system 220 calculates a Gödel number for an executed sequence of the plurality of operations.

The Gödel number calculation could be performed by multiplying the $P^S$ values of the unique prime numbers and unique integers as previously described herein. At 324, the control system 220 compares the calculated Gödel number to a set of acceptable Gödel numbers corresponding to a set of acceptable sequences for executing the plurality of operations. When there is a match, the method 300 ends or continues to execute the software until its completion. When there is not a match, the method 300 proceeds to 328 where the control system 320 detects an error. At 332, the control system 220 controls the vehicle sub-system according to a remedial or corrective action for the error and the method 200 then ends or continues to execute the software until its completion. At optional 336 and 340, the control system 220 could generate or maintain an error log detailing detected error(s) at 336 and then could analyze the errors at 340, such as for self-learning or other uses, such as debugging of the software. This could include, for example only, intelligently analyzing a particular error in the error log by decomposing the calculated Gödel number value via prime number factoring to identify where in the executed sequence of the plurality of operations the error occurred. Self-learning, for example, could involve identifying propagating errors and learning a tolerance for such errors. This could include adjusting thresholds or training a machine learning model based on the learned information.

It will be appreciated that the term "controller" as used herein refers to any suitable control device or set of multiple control devices that is/are configured to perform at least a portion of the techniques of the present application. Nonlimiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A software security system for a vehicle, the software security system comprising:
    a control system configured to control operation of the vehicle;
    a vehicle sub-system configured to be electronically controlled by the control system via software executed by the control system, wherein the software defines a plurality of operations; and
    wherein the control system is further configured to:
        define a plurality of waypoints within the plurality of operations of the software;
        apply Gödel numbering to the software by (i) assigning a unique integer to each of the plurality of waypoints and (ii) assigning a unique prime number to each sequential operation of the plurality of operations;
        calculate a Gödel number for an executed sequence of the plurality of operations;
        compare the calculated Gödel number to a set of acceptable Gödel numbers corresponding to a set of acceptable sequences for executing the plurality of operations; and
        when the calculated Gödel number does not match any of the set of acceptable Gödel numbers, control the vehicle sub-system according to a remedial or corrective action.

2. The software security system of claim 1, wherein the vehicle sub-system is a drive-by-wire system in which the vehicle sub-system is configured to electromechanically control a corresponding vehicle actuator in response to electronic control signals from the control system.

3. The software security system of claim 2, wherein the vehicle sub-system includes at least one of an electric motor system, a brake system, and a transmission system.

4. The software security system of claim 2, wherein the vehicle sub-system includes a plurality of independent and interconnected drive-by-wire systems.

5. The software security system of claim 1, wherein the software is executed asynchronously by the control system.

6. The software security system of claim 5, wherein the software is partially executed by at least two independent controllers of the control system or by at least two independent cores of a single processor of the control system.

7. The software security system of claim 1, wherein the control system is configured to control the vehicle sub-system according to the remedial or corrective action without resetting the control system and is further configured to generate or maintain an error log detailing any executed sequences of operations having unmatched calculated Gödel numbers.

8. The software security system of claim 7, wherein the control system is configured to intelligently analyze a particular error in the error log by decomposing the calculated Gödel number value via prime number factoring to identify where in the executed sequence of the plurality of operations the error occurred.

9. The software security system of claim 8, wherein the control system is configured to perform self-learning based on the logged/stored and analyzed errors.

10. A software security method for a vehicle, the software security method comprising:
    providing a control system configured to control operation of the vehicle;
    providing a vehicle sub-system configured to be electronically controlled by the control system via software executed by the control system, wherein the software defines a plurality of operations;
    defining, by the control system, a plurality of waypoints within the plurality of operations of the software;
    applying, by the control system, Gödel numbering to the software by (i) assigning a unique integer to each of the plurality of waypoints and (ii) assigning a unique prime number to each sequential operation of the plurality of operations;
    calculating, by the control system, a Gödel number for an executed sequence of the plurality of operations;
    comparing, by the control system, the calculated Gödel number to a set of acceptable Gödel numbers corresponding to a set of acceptable sequences for executing the plurality of operations; and
    controlling, by the control system, the vehicle sub-system according to a remedial or corrective action when the calculated Gödel number does not match any of the set of acceptable Gödel numbers.

11. The software security method of claim 10, wherein the vehicle sub-system is a drive-by-wire system in which the vehicle sub-system is configured to electromechanically control a corresponding vehicle actuator in response to electronic control signals from the control system.

12. The software security method of claim 11, wherein the vehicle sub-system includes at least one of an electric motor system, a brake system, and a transmission system.

13. The software security method of claim 11, wherein the vehicle sub-system includes a plurality of independent and interconnected drive-by-wire systems.

14. The software security method of claim 10, wherein the software is executed asynchronously by the control system.

15. The software security method of claim 14, wherein the software is partially executed by at least two independent controllers of the control system or by at least two independent cores of a single processor of the control system.

16. The software security method of claim 10, wherein the control system is configured to control the vehicle sub-system according to the remedial or corrective action without resetting the control system, and wherein the method further comprises generating or maintaining, by the control system, an error log detailing any executed sequences of operations having unmatched calculated Gödel numbers.

17. The software security method of claim 16, further comprising intelligently analyzing, by the control system, a particular error in the error log by decomposing the calculated Gödel number value via prime number factoring to identify where in the executed sequence of the plurality of operations the error occurred.

18. The software security method of claim 17, further comprising performing, by the control system, self-learning based on the logged/stored and analyzed errors.

* * * * *